United States Patent [19]

Kai et al.

[11] 4,352,955
[45] Oct. 5, 1982

[54] CONTROL SIGNAL TRANSMISSION SYSTEM FOR USE IN A MOBILE RADIO COMMUNICATION SYSTEM

[75] Inventors: Tomokazu Kai; Akio Saito, both of Tokyo, Japan

[73] Assignee: Nippon Electric Co., Ltd., Tokyo, Japan

[21] Appl. No.: 116,773

[22] Filed: Jan. 30, 1980

[30] Foreign Application Priority Data

Feb. 14, 1979 [JP] Japan .................................. 54-16630

[51] Int. Cl.³ .............................................. H04Q 7/00
[52] U.S. Cl. ............................... 179/2 EB; 179/2 EC; 455/31
[58] Field of Search ............ 179/2 EB, 2 EC; 455/31, 455/33

[56] References Cited

U.S. PATENT DOCUMENTS

| | | | |
|---|---|---|---|
| 3,836,726 | 9/1974 | Wells et al. ........................ | 179/2 EC |
| 4,031,330 | 6/1977 | van Leeuwen ................... | 179/2 EB |
| 4,112,257 | 9/1978 | Frost ................................ | 179/2 EB |
| 4,144,409 | 3/1979 | Utano et al. ..................... | 179/2 EB |
| 4,145,657 | 3/1979 | Hanni ............................ | 179/2 EB X |

OTHER PUBLICATIONS

"800 MHz Band Land Mobile Telephone Control System;" Yoshikawa et al., Review of the Electrical Comm. Laboratories, vol. 25, Nos. 11–12, Nov.–Dec. 1977—pp. 1172–1190.

*Primary Examiner*—Stuart N. Hecker
*Attorney, Agent, or Firm*—Laff, Whitesel, Conte & Saret

[57] ABSTRACT

A control signal transmission system for mobile radio communications uses a plurality of control channels extending between a plurality of mobile units and at least one control center. The control center transmits system information signals and paging signals during individually associated time frames. The mobile units transmit response signals corresponding to the paging signals by transmitting to the control centers through the control channels. At least one frame of the system provides for a transmission of responsive information signals, following each frame including the paging signals. Each of these response signals includes an identification number of the replying mobile unit.

2 Claims, 12 Drawing Figures

CONTROL SIGNAL TRANSMISSION SYSTEM FOR USE IN A MOBILE RADIO COMMUNICATION SYSTEM

The present invention relates to mobile radio communication systems which have a fixed station and a number of mobile units between which control signals are transmitted. In particular, the invention relates to a control signal transmission system in which paging (calling) signals and system information signals are transmitted from the fixed station to mobile units. Response signals are sent from the mobile units to the fixed station.

Known automobile telephone radio communication systems are shown, for example, in (1) U.S. Pat. No. 4,144,409, or (2) N. Yoshikawa et al. "800 MHz Band Land Mobile Telephone Control System," Review of The Electrical Communication Laboratories, Volume 25, Nos. 11-12, pp. 1172-1190, November-December, 1977.

Such automobile telephone radio communication systems comprise a number of mobile units. Base stations installed in a number of radio zones communicate with the mobile units, control stations which connect with the base stations by wire links, and a mobile telephone center which connects with the control stations by wire links.

In this configuration, the control stations always transmit the system information signals to the mobile units via control channels (in particular via paging channels: P-ch) extending through the base stations while the mobile units are standing by. These system information signals contain the call numbers of available access channels ("A-ch"), which are used to quickly acquire control channels (in particular "A-ch") when the mobile units are originating calls. Also, these information signals contain location information relative to the mobile units used when the control stations transmit the paging signals in the required areas. Other information may also be sent.

The mobile units receive these system information signals and store the latest system information. The mobile units send location registration signals to the base stations via A-ch and store such location signals in the memory of the mobile telephone center, which memory is accessed through control stations.

In this state, when a mobile unit receives a termination call from an ordinary or land-based subscriber or from another mobile unit, the mobile telephone center first designates, according to the information stored in its memory, the zone in which the called mobile unit exists. The mobile telephone center transmits a paging signal (including the identification number of the called mobile unit) to all of the control stations in the applicable zone. The control stations temporarily stop transmitting the information signals through the mobile system and transmit instead the paging signal from their base stations to the mobile units by using a (paging channel) P-ch.

The paged mobile unit returns a response signal to the base station by using a P-ch. Each base station transfers a signal indicating the level of this response signal to the control stations. The control stations discriminate between these levels to select the base station in the radio zone which is closest to the applicable mobile station, whereupon the mobile unit enters into speech service with an ordinary subscriber, or with another mobile unit.

In the conventional transmission time relationship between the paging and the response signals, the response signal lengths are shorter than the paging signal lengths. Thus, the response signals do not overlap each other, even when the paging signals are continuously sent. Since each response signal contains a preamble signal, check bit and word synchronization signal, an effective information of the response signal becomes even shorter. Therefore, it has not been possible to add an identification number of the mobile unit to each response signal.

As stated, in conventional systems, a control station has no alternative other than to judge that a response signal received within a certain time after the sending of a paging signal is the response signal from the applicable mobile unit. This leads to the possibility that the channel assignment signal can be sent to a mobile unit which has responded erroneously. This channel assignment signal contains an identification number, so that the mobile unit which has correctly responded does not switch to the assigned speech channel (S-ch) and stands by to receive a channel assignment signal which is to be sent next.

The control station, on the other hand, has already received a response signal and awaits a loop check tone from the mobile unit after recycling only the channel assignment signal. In the end, the process finishes in "recycle over," and giving a "busy" signal to the ordinary subscriber, to finish this call. The ordinary subscriber, upon being notified that the link is busy, must originate the call again. This increases P-ch (paging channel) traffic.

A control station must be equipped with gates, delay circuits, circuits for adding identification numbers to decoded response signals, and other circuits, are to enable the response signals to be received with a certain timing. The system information signals must be sent for one frame or a few frame, without fail, after sending the paging signals for a certain duration of time. Therefore, counters must be provided for counting the frames of these signals. The mobile units, on the other hand, must be provided with two types of check bit encoders since signals lengths of response signal and other signals (e.g. mobile origination signal) are different, as state. This increases constituent elements.

An object of the present invention is, therefore, to provide a control signal transmission system for use in mobile radio communications which eliminates the foregoing problems, which is highly reliable, and which is simple in construction.

According to the present invention, a control signal transmission system for mobile radio communications uses control channels between a plurality of mobile units and at least one control center. The control center transmits system information signals and paging signals to the mobile units via the control channels during time frames and the mobile units transmit response signals corresponding to the paging signals, to the control centers through the control channels. At least one frame of the system information signals are transmitted following each frame of the paging signals. Each response signal includes an identification number for each mobile unit.

The above-mentioned and other features and objects of the present invention will become more apparent by referring to the following description taken in conjunction with the accompanying drawings; in which:

Figure 1:
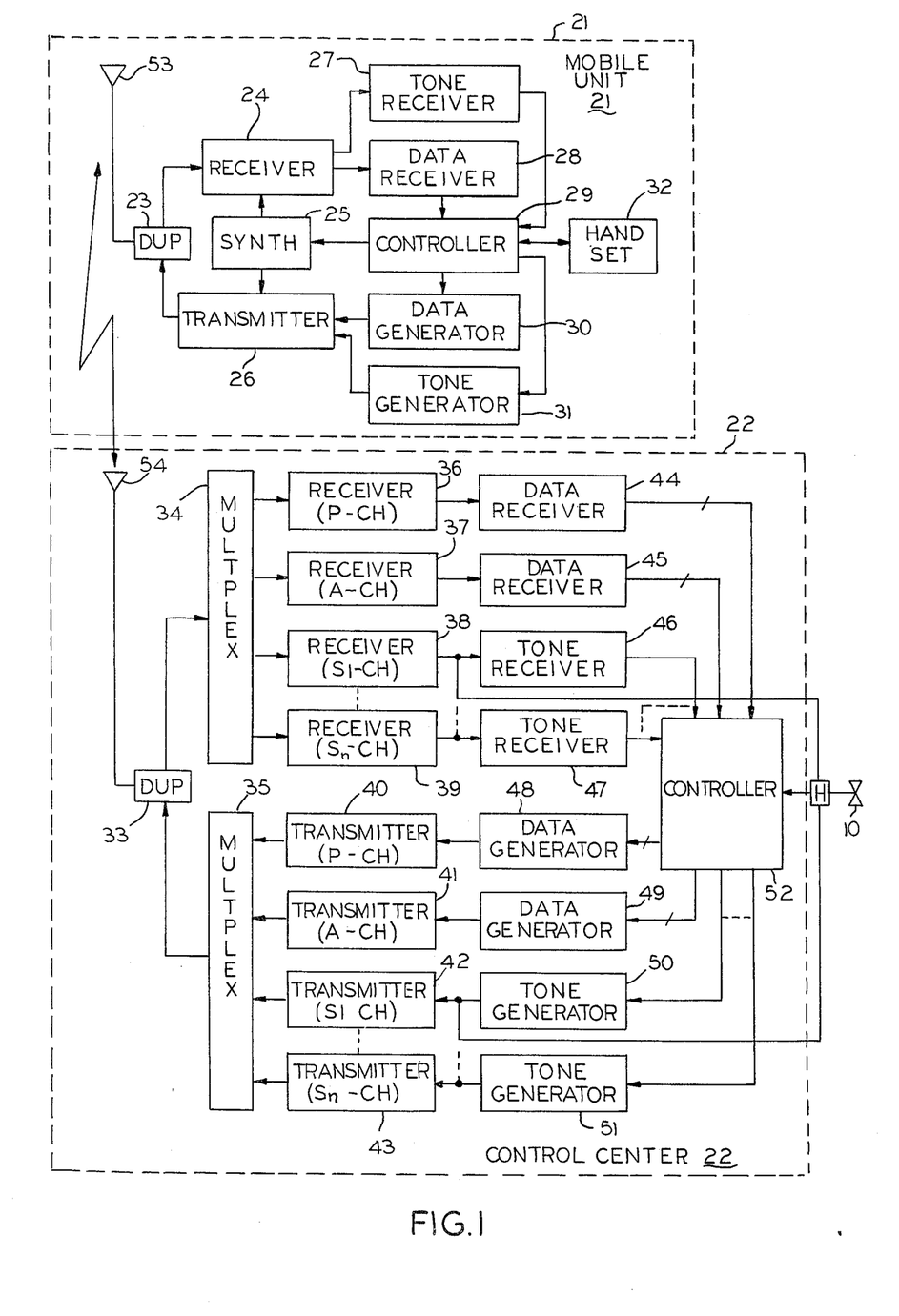
FIG. 1 is a block diagram of a mobile unit and a control center in a mobile radio telephone communication system.

Generally speaking, large-capacity automobile telephone radio communication systems tend to have complex configurations, such as those illustrated in FIG. 1 of U.S. Pat. No. 4,144,409 and in FIG. 1 on page 1176 of the Yoshikawa et al. article, cited above. FIG. 1 is a simplified version of the configuration of the present invention, given for a better understanding of this system, without impairing the generality of it. In the figure, the control center combines a base station and a control station. Both the access and paging channels (A- and P-ch) are shown as being singular, while the speech channel (S-ch) is shown plural.

Below, a conventional system will be explained by referring to FIGS. 1 and 4.

Figure 3:
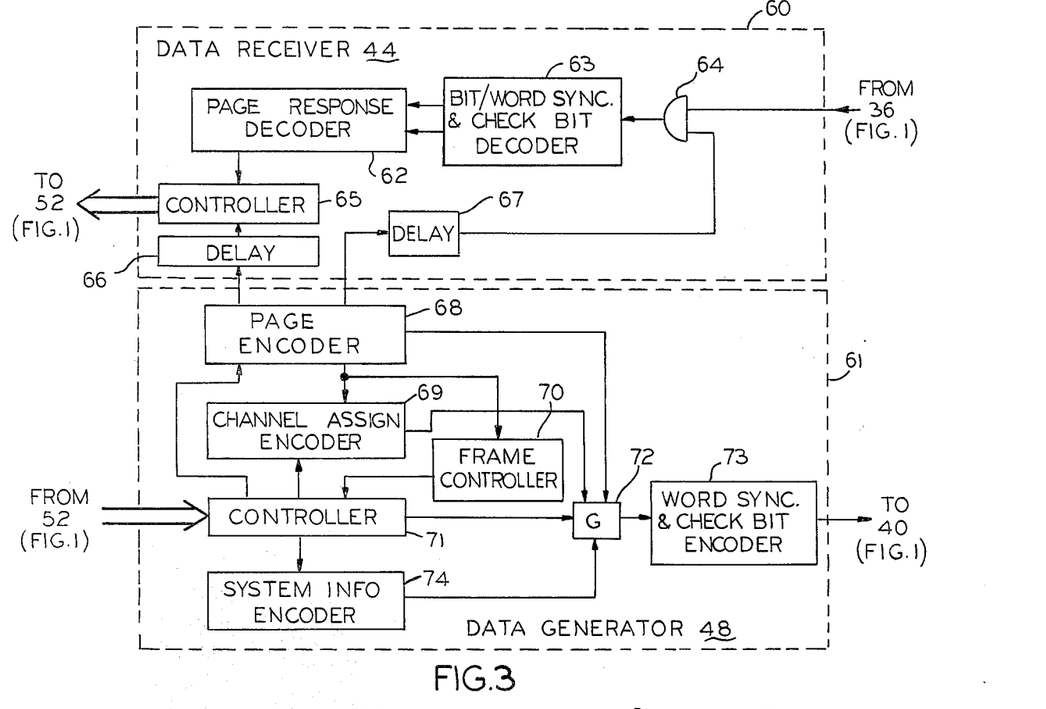
FIG. 3 is a block diagram of a data generator and data receiver in a conventional control center which correspond to the data generator and the data receiver shown in FIG. 1, respectively.

A controller 52 in a control center 22 sends control signals to the data generator 48 while a mobile unit 21 stands by. This data generator has the configuration shown by block 61 in FIG. 3 in a conventional system. Control signals from the controller 52 (FIG. 1) is supplied to a controller 71 (FIG. 3). The controller 71 activates system information code encoder 74 and a gate 72, in response to the control signals.

Figure 2:
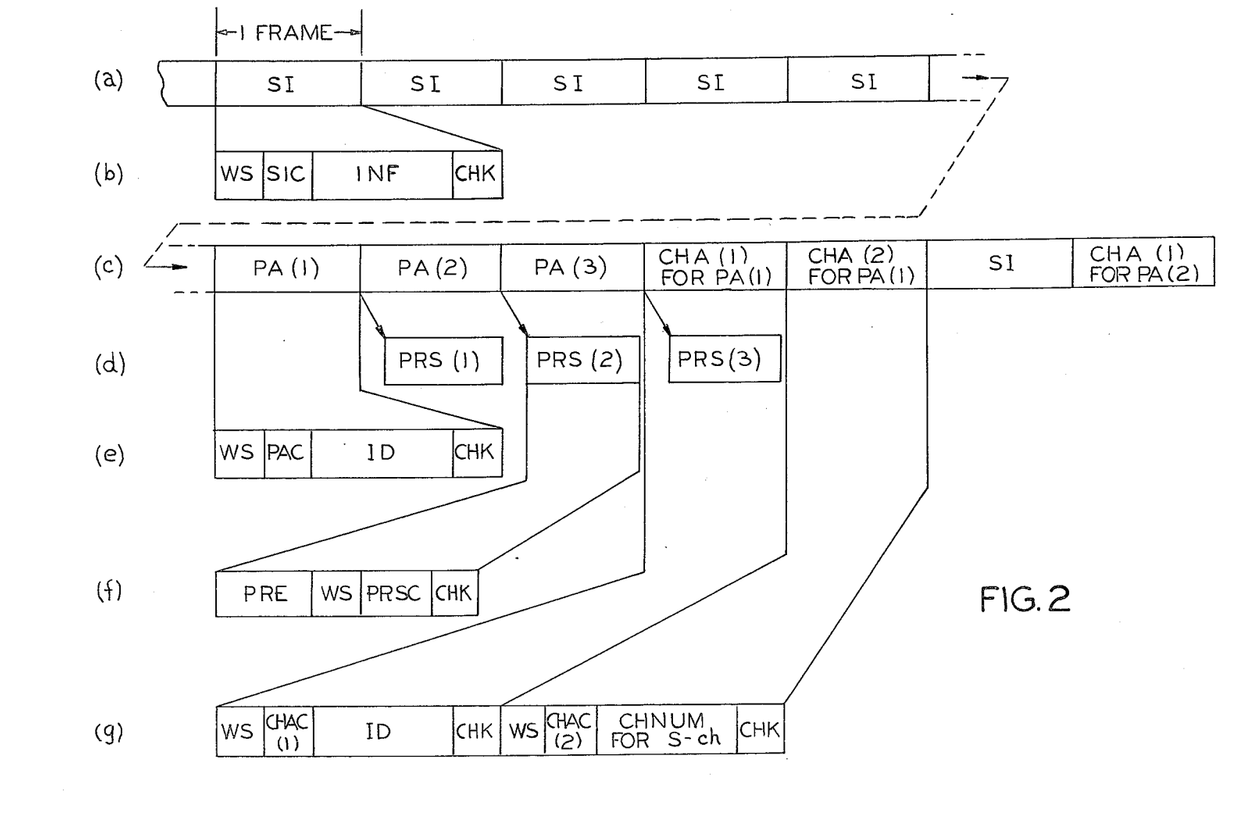
FIG. 2, consisting of a–g, is a configuration diagram of conventional control signals.

The encoder 74 generates a system information control (SIC) code and information (INF) code included in a system information (SI) code shown in FIG. 2(b). The SIC and INF codes are supplied to the word synchronization and check bit encoder 73 via the gate 72. The INF code contains the location information and available A-ch (access channel) numbers of the mobile unit. The encoder 73 continuously generates SI codes time frames, as shown in FIG. 2(a) by adding a word synchronization (WS) code and a check bit (CHK) code before and after the SIC code and the INF code, respectively, as shown in FIG. 2(b). The transmitter 40 (FIG. 1) modulates a carrier wave with the SI (system information) code to transmit the modulated carrier wave to the mobile unit 21 through a multiplexer 35, a duplexer 33, and an antenna 54.

The receiver 24 in the mobile unit 21 receives the modulated wave from the antenna 53 and the duplexer 23. The P-ch (paging channel) assigned by a controller 29 is set in a frequency synthesizer 25. In the receiver 24, the demodulated SI (system information) code is supplied to the data receiver 28. A conventional data receiver 28 has the configuration shown in the dashed line rectangle 78 in FIG. 4. The SI code is supplied to a bit/word synchronization and check bit decoder 81. The bit, and word synchronization is established in the decoder 81. The CHK (check) code is decoded. The SIC (system information control) code, INF (information) code and decoded CHK code are sent to a system information decoder 83. The SIC and INF codes are decoded by the decoder 83 are stored in the memory which is contained in the controller 29 (FIG. 1). The contents of the memory are updated whenever any one of these codes is modified.

Paging occurs when an ordinary land subscriber 10 originates a call while in such a stand-by state. The control center 22 temporarily stops or interrupts transmission of the SI (system information) code and transmits the paging (PA) codes shown in FIG. 2(c). That is, the controller 52 sends a control signal to the data generator 48 (shown in detail at 61 in FIG. 3). This conrtrol signal is supplied to the controller 71 FIG. 3, to activate a paging encoder 68 and the gate 72. The paging encoder 68 generates a paging control (PAC) code and identification number (ID) code included in the PA code shown in FIG. 2(e). The PAC code and ID code are supplied to the encodrer 73 through the gate 72. The encoder 73 adds a WA (word synchronization) code and CHK (check) code shown in FIG. 2(e) to the PAC and ID codes, respectively. Three frames of the PA (paging) codes which have different PAC and ID codes are produced from the generator 61 (FIG. 1) as shown in FIG. 2(c). These PA codes ($PA_1$, $PA_2$, and $PA_3$) are sent to the mobile unit, in the manner that the SI (system information) codes are sent.

In the applicable mobile unit, the data receiver 28 (FIG. 1; shown in detail at 78 in FIG. 4) for the ID (identification) code contained in one of these PA (paging) codes, decodes the PA code in the paging decoder 80, to send to the controller 29.

Figure 4:
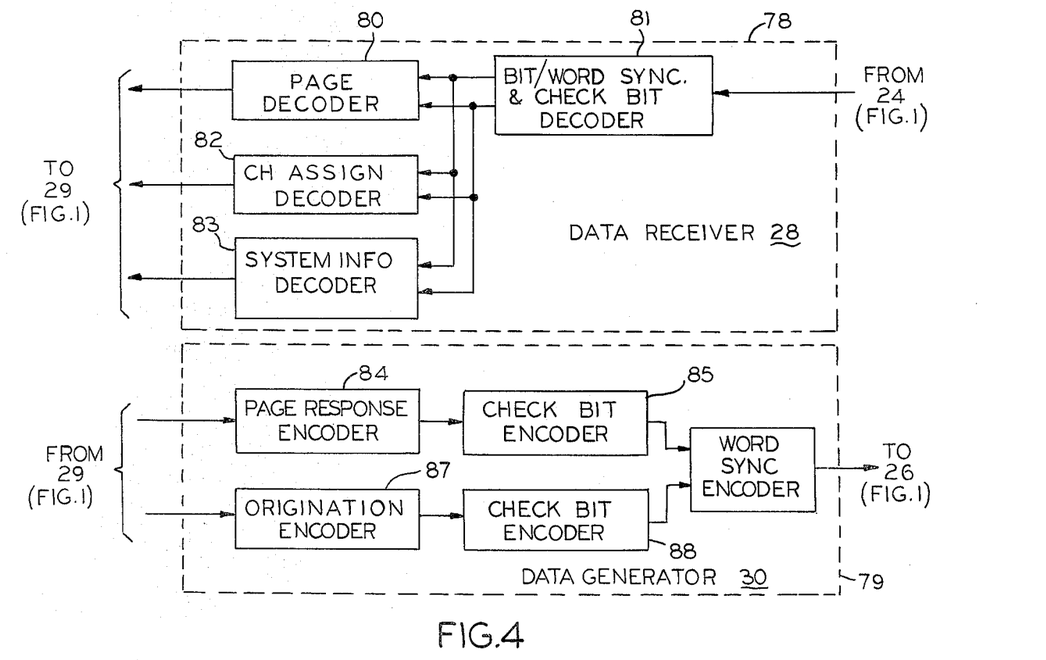
FIG. 4 is a block diagram showing a data receiver and a data generator in a conventional mobile unit which correspond to the data receiver and the data generator shown in FIG. 1, respectively.

The controller 29 (FIG. 1) sends the control signal to the data generator 30, which has a configuration shown by the circuit at reference numeral 79 in FIG. 4. The control signal activates a paging response encoder 84, to generate a paging response control (PRSC) code. The check bit encoder 85 and the word synchronization encoder 86 add a CHK (check) code and a WS (word synthronization) code to the PRSC code, respectively, and these codes are sent to the transmitter 26 (FIG. 1). A PRS (paging response) code consists of a preamble (PRE), WS, PRSC, and CHK code as shown in FIG. 2(f).

The transmitter 26 modulates a carrier wave of a P-ch (paging channel) with the PRS (paging response) codes and sends them to the control center 22 through the duplexer 23 and the antenna 53. This modulated carrier wave passes through the antenna 54, the duplexer 33, the multiplexer 34, and is demodulated in the receiver 36. The demodulated PRS codes are supplied to the data receiver 44, which has a configuration shown by circuit 60 in FIG. 3, in a conventional system.

The paging encoder 68 (FIG. 3) and a delay circuit 67 determine the timing so that a gate 64 is opened for a certain time period in this circuit 60 after a PA paging code is sent. The bit/word synchronization and check bit decoder 63, like the decoder 81 (FIG. 4), receives the PRS (paging response) code as shown in FIG. 2(d) during this gating period and sends the PRSC (paging response control) code and decoded CHK (check) code to a paging response decoder 62 (FIG. 3) to decode the PRSC code. In the controller 65, the ID identification code from the paging encoder 68 passes through a delay circuit 66 where it is added to the PRSC code and is sent to the controller 52 (FIG. 1).

Here, the controller 52 supplies an idle S-ch (speech channel) number, for instance, $S_1$-ch, to the controller 71 in FIG. 3. The controller 71 activates a channel assignment encoder 69 to generate first and second channel assignment control (CHAC(1), CHAC(2)) code, an ID identification code and a speech channel number (CHNUM) code included in channel assignment (CHA(1), CHA(2)) codes shown in FIGS. 2(c) and 2(g). These codes are supplied to the encoder 73, to produce CHA (1) and CHA (2) codes which are then sent to the transmitter 40 (FIG. 1).

A frame counter 70 (FIG. 3) is used to count the number of frames for the PA (paging and CHA channel assignment) codes sent in a frame sequence shown in FIG. 2(c). The transmitter 40 modulates a carrier wave with the CHA (channel assignment) codes and sends them to the mobile unit 21 (FIG. 1), like the foregoing PA paging codes. The mobile unit corresponding to the ID identification code contained in this CHA (1) (channel assignment) code decodes the CHA codes in the channel assignment decoder 82 shown in FIG. 4. The controller 29 (FIG. 1) assigns the synthesizer 25 to tune the receiver 24 and the transmitter 26 to the frequency corresponding to the channel number in response to the decoded CHNUM (speech channel number) code.

Figure 5:
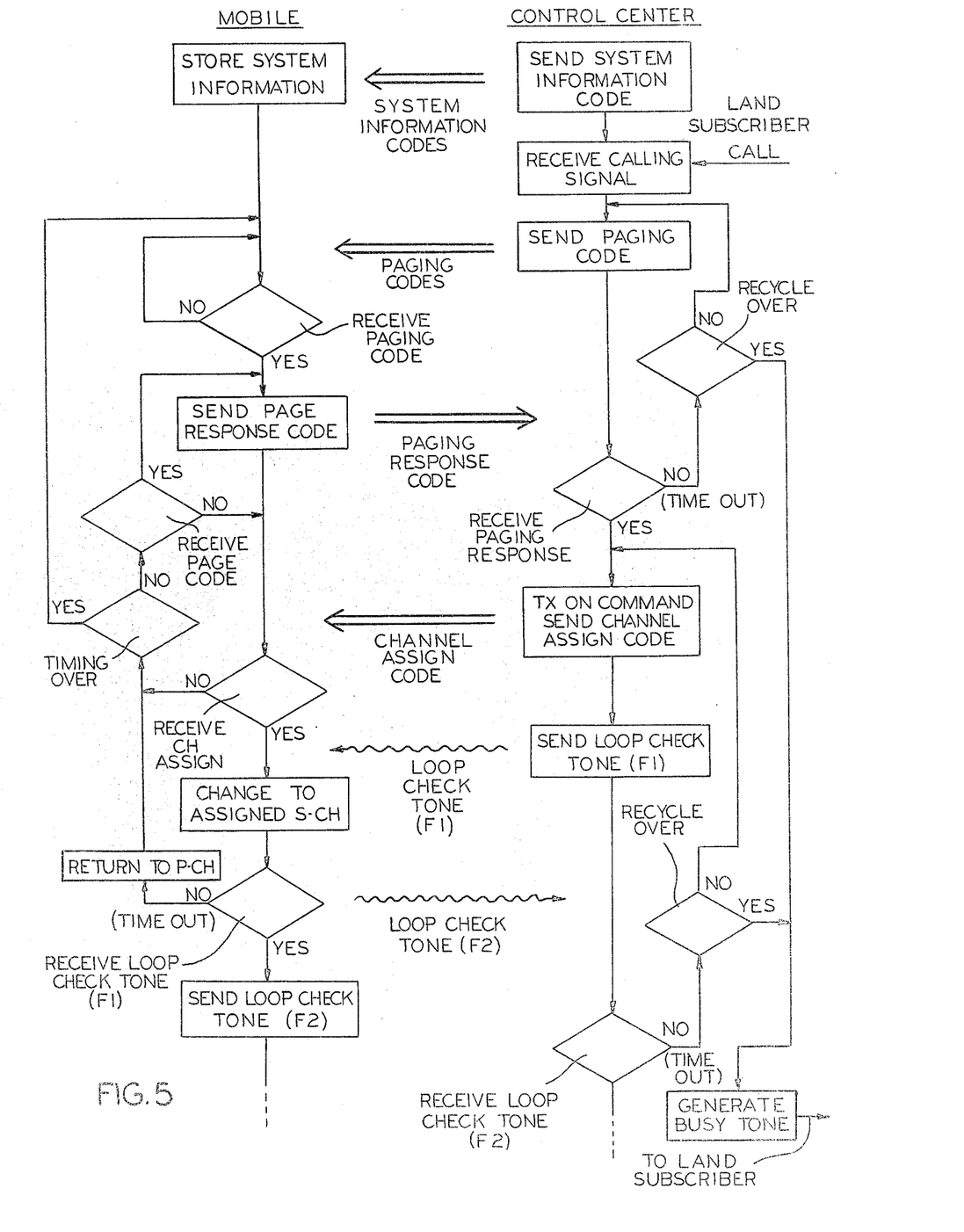
FIG. 5 is a flow chart outlining the operation of an automobile telephone radio communication system.

The controller 52 (FIG. 1) in the control center 22 operates the tone generator 50 for an $S_1$-ch (speech channel) and sends a loop check tone $F_1$ to the mobile unit. There a tone receiver 27 detects this loop check tone $F_1$ as the receiver 24 locks to the $S_1$-ch (speech channel). The controller 29 responds to this loop check tone detection and activates a tone generator 31. The tone generator 31 generates a second loop check tone $F_2$ and sends it to the control center 22 through the transmitter 26, etc. A tone receiver 46 in the control center 22 confirms that the system has a correct loop for the speech channel $S_1$-ch when it receives the tone $F_2$. When a handset 32 of the mobile unit goes off-hook after the receipt of a ringing tone, a conversation may be carrier on with the ordinary subscriber 10. The flow chart in FIG. 5 facilitates understanding of the foregoing procedure.

In FIG. 1, the reference numeral 39 denotes a receiver for the last speech channel $S_n$-ch. The associated circuits are a transmitter 43 for the speech channel $S_n$-ch; a tone receiver 47; and a tone generator 51. In FIG. 4, an origination encoder 87 and a check bit encoder 88 are used when the mobile unit originates a call.

Figure 6:
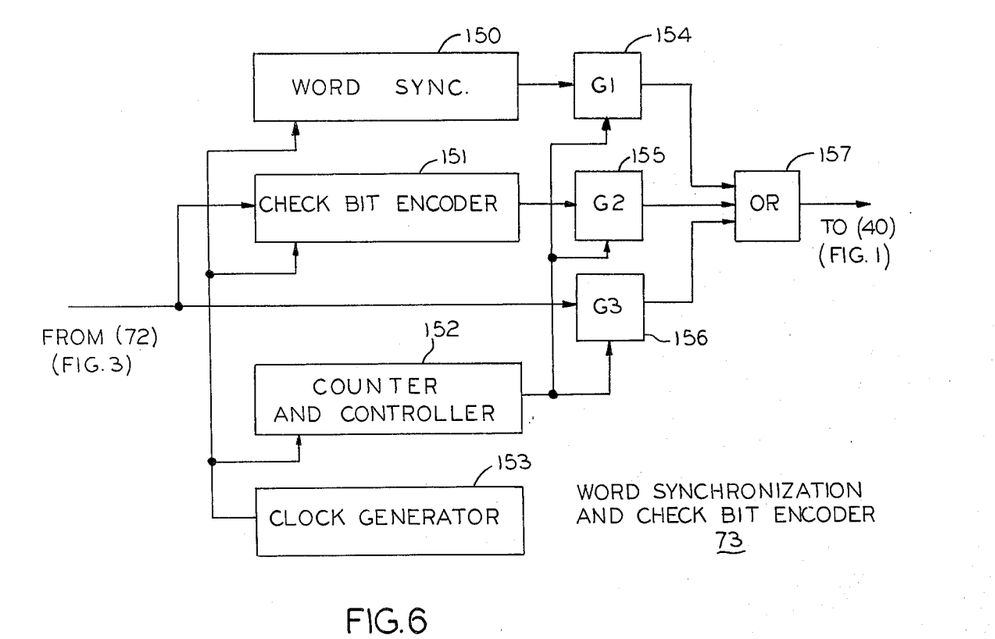
FIG. 6 is a more concrete example of a block diagram showing the word synchronization and check bit encoder shown in FIG. 3.

FIG. 6 shows the block diagram of the preferred embodiment of the word synchronization and check bit encoder circuit 73 (FIG. 3). In FIg. 6, a controller 152 responds to a clock generator 153 and controls the gating time of the gates 154 to 156. For instance, when an SIC (system information control) code and an INF (information) code are received through the gate 72 (FIG. 3), as shown in FIG. 2(b), the gate 154 (FIG. 6) is first opened by the output of the controller 152. A WS (word synchronization) code from the word synchronization encoder 73 (FIG. 3) is read responsive to the output of the clock generator 153, and added to other signals by an OR gate 157. Next, the gate 156 is opened, and the SIC (system information control) code and the INF (information) code are supplied to the OR gate 157. The gate 155 is then opened, and CHK (check) codes are generated in response to the WS (word synchronization), SIC (system information control), and INF (information) codes by an encoder 151, and the resulting codes are supplied to the OR gate 157. The SI (system information) codes, as shown in FIG. 2(b), are obtained from this OR gate 157.

Figure 7:
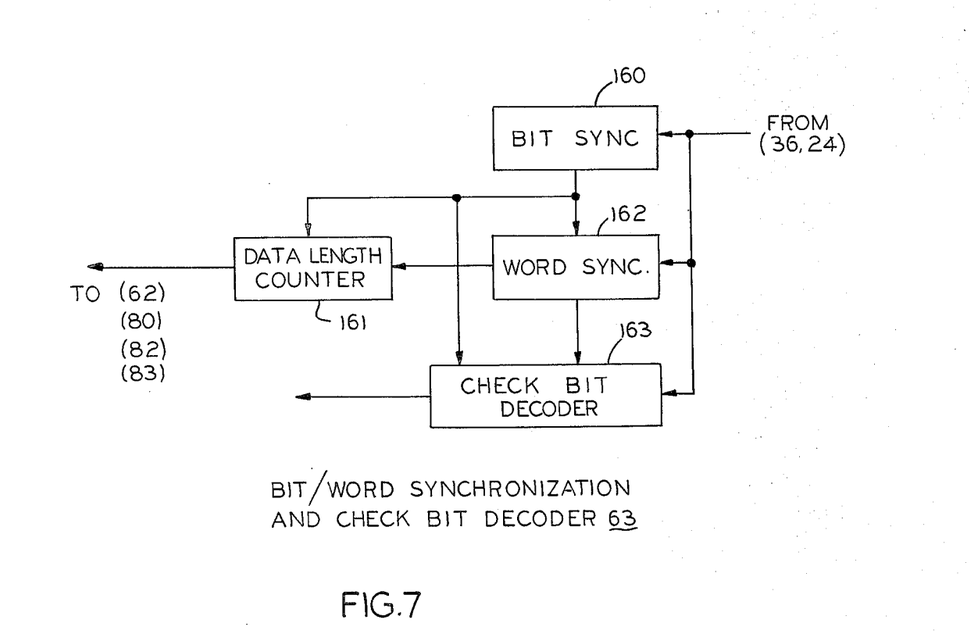
FIG. 7 is a more concrete block diagram of bit/word synchronization and check bit decoders in FIGS. 3 and 4, respectively.

FIG. 7 shows a block diagram of the preferred embodiment of the bit word synchronization and check bit decoder circuits 63 (FIG. 3) or 81 FIG. 4. The bit synchronization circuit 160 in FIG. 7 extracts a clock signal from the received codes. When bit synchronization is established, the WS (word synchronization) codes are detected by a word synchronization circuit 162. A command is issued to a data encoder through a check bit decoder 163 and a data length counter 161 to start reading a control code and an information code from this detection point. The received control code and the information code are decoded by the decoder (e.g., MC8503 manufactured and sold by Motorola Inc.) 163. The codes are checked for their correction by comparing them with the CHK check code that is received. Alternatively, a decoder for correcting data errors may be used.

As explained above, in a conventional control signal system, the code lengths of PRS (paging response) codes are shorter than those of PA paging codes so that the PRS codes do not overlap even when the PA codes are sent continuously, as shown in FIGS. 2(c) and 2(d) in relation to the transmission times between the PA and PRS codes. Since the PRS codes contain PRE (preamble) codes, the CHK (check) codes and word synchronization code as shown in FIG. 2(f), PRSC (paging response control) codes, which are valid information, become shorter. Therefore, it has not been possible to add ID identification codes for the mobile unit to the PRS codes.

In such a transmission system, the control center has no alternative other than to judge whether a PRS (paging response) code, received within a certain time frame after sending a PA code is the PRS (paging) code, sent from the applicable mobile unit, because the ID identification code cannot be added to the PRS code. There is a possibility that a CHA (channel assignment) code is sent to the mobile unit which has responded erroneously. The ID code shown in FIG. 2(g) is added to this CHA code. A mobile unit which has correctly responded stands by, ready to receive a CHA (channel assignment) code to be sent next, without switching to the assigned speech channel S-ch. The control center, on the other hand, has once received a PRS (paging response) code and stands by for a loop check tone from the mobile unit by recycling CHA (channel assignment) codes. After the recycle is over, this call is indicated as busy for the originating subscriber. After failing to complete a connection, the subscriber again originates a call. This increases the traffic for the paging channel P-ch.

The PA (paging) code and the corresponding CHA (channel assignment) codes (PA (1) and CHA (12) and CHA (2), for instance) continuously occupy the paging channel P-ch when the traffic is congested. An SI (system information) code has to be inserted forcibly if the occupancy of these codes continues for longer than a certain number of frames (e.g., several ten frames). This insertion may be completed under the control of the frame counter 70 in FIG. 3, because the SI codes are indispensable to efficiently operate the system. The no delayed ID (identification) codes, from the paging encoder 68 must be added correctly to the received PRS (paging response) codes by using the controller 65. The PRS codes do not include ID codes, while origination codes do contain ID codes. Accordingly, separate encoders 85 and 88 (FIG. 4) should be provided for these codes.

Figure 8:
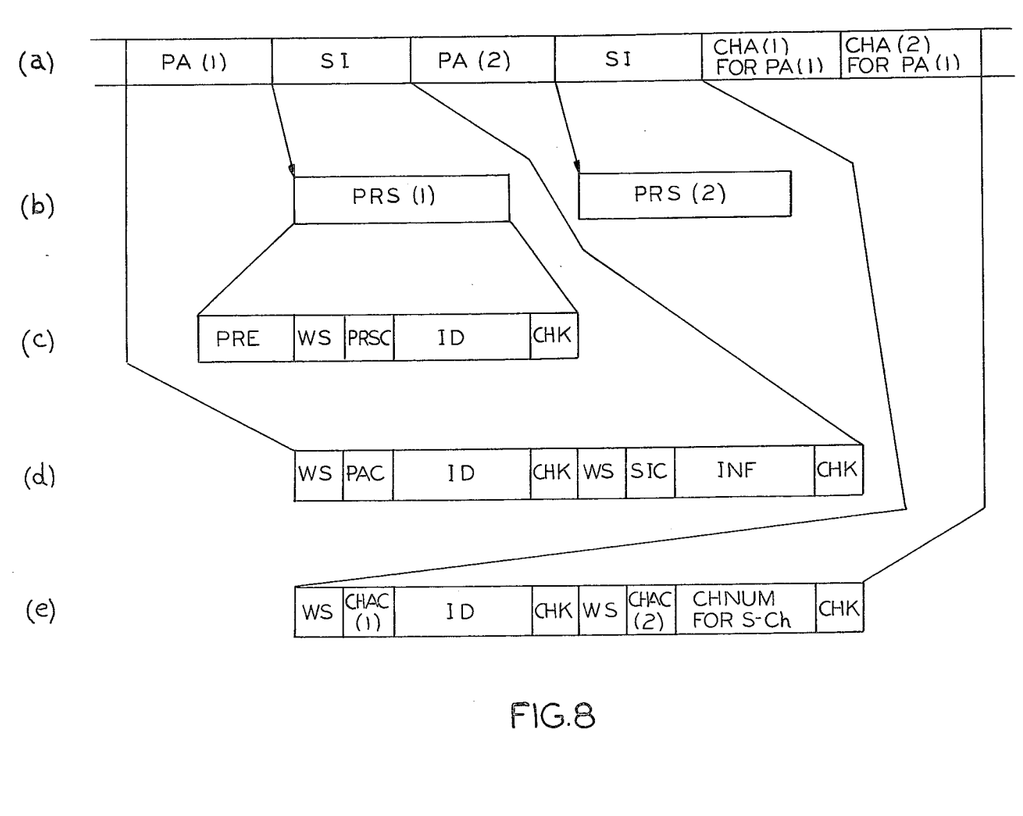
FIG. 8, consisting of a–e, is a configuration of control signals of the present invention.

To eliminate the foregoing defects, in the present invention SI (system information) codes of at least one frame are sent from the control center to the mobile unit for each frame of PA (paging) codes as shown in FIG. 8(a), when originating a paging. In such a signal transmission system, a PRS (paging response) code can be lengthened as long as the PRS code does not overlap. In this application example, SI (system information) codes of one frame are added to PA codes of one frame. However, SI codes of a few frames may be also be added to such paging signals. Therefore, an ID code can be added to a PRS code, and a PRS code without a PRE (preamble) code can be made to have the same code length as that of PA, SI, CHA (channel assignment), or another code. While not illustrated here, an origination code can also be made to have the same length. Therefore, a PRS code can be received without error, and the circuitry in mobile units and the control center can be simplified.

Below, a preferred embodiment of the present invention will be explained. To avoid duplication by giving an explanation of conventional systems, only those sections which differ from conventional systems will be explained.

Figure 9:
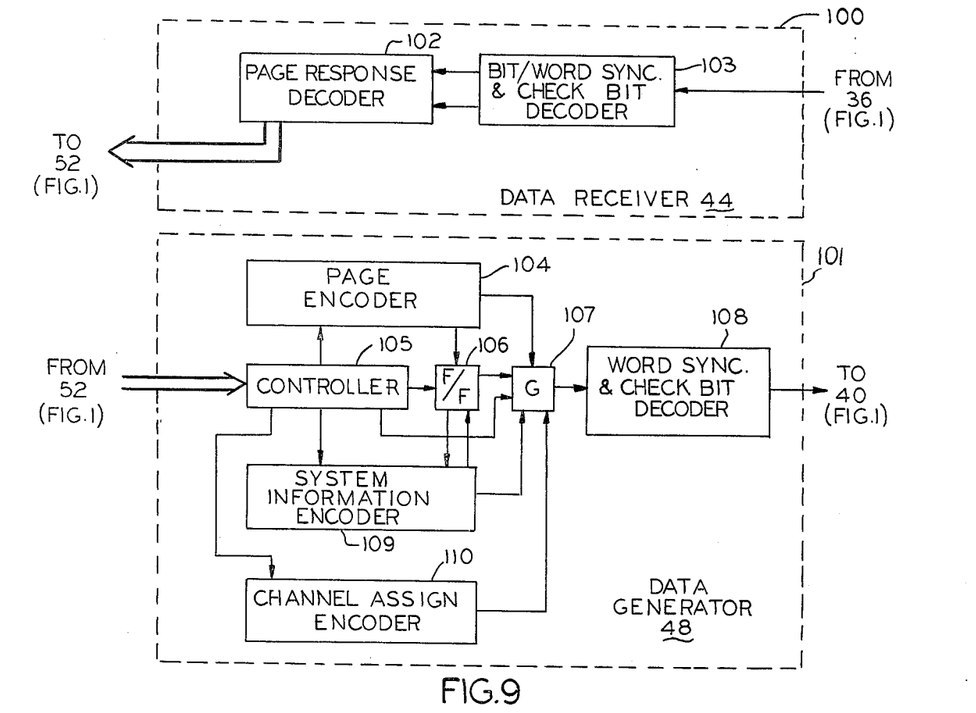
FIG. 9 is a block diagram of a data generator and data receiver in a control center according to the present invention, which correspond to the data generator and data receiver shown in FIG. 1, respectively.

FIG. 9 is a block diagram of the data generator 101 and data receiver 100, used in the present invention. They correspond respectively to the data generator 48 and the data receiver 44 in FIG. 3. In FIG. 9, when a PA (paging) code is not sent as shown in FIG. 8(d), control signals from the controller 52 (FIG. 1) are supplied to a controller 105. The controller 105 controls the system information encoder 109, flip-flop 106, and gate 107 so that codes from system information encoder 109 are always supplied to an encoder 108. The encoder 108 supplies SI (system information) codes to the transmitter 40 in FIG. 2 as in conventional systems.

When sending PA paging codes shown in FIG. 8(a), the controller 105 controls the encoder 104, F/F (flip-/flop) 106, and gate 107 so that the output of the paging encoder 104 are supplied to the encoder 108. When a PA code (PA (1) in FIG. 8(a)) ends, the gate 107 is controlled through F/F 106 by responsive to a signal from the encoder 104, to supply an SI (system information) code the encoder 108 as shown in FIG. 8(a). Next, when this SI code ends, the gate 107 is controlled by a signal from the encoder 109 through F/F 106, to again supply the output (PA (2)) of the encoder 104 to the encoder 108. When sending CHA (channel assignment) codes as shown in FIG. 8(a) and 8(e) (CHA (1) and CHA (2)), the gate 107 is switched to the CHA encoder 110, to supply this output to the encoder 108. The encoder 108 has the same configuration as that shown in FIG. 6.

The data receiver 100 shown in FIG. 9 supplies PRS (paging response) codes, which contain ID (identification) codes, as shown in FIG. 8(c), to the decoder 103 for synchronization and checking. The PRS codes are supplied to the paging response decoder 102. The data receiver 100, unlike the receiver 60 in FIG. 3, does not require any particular signals from the generator 101. It operates entirely independently. Accordingly, it is no longer necessary to receive PRS codes in accurate timing by employing a gate 64, controller 65, delay circuits 66 and 67, and encoder 68 as in the conventional system shown in FIG. 3 and to send to the controller 52 after adding ID codes.

Figure 10:
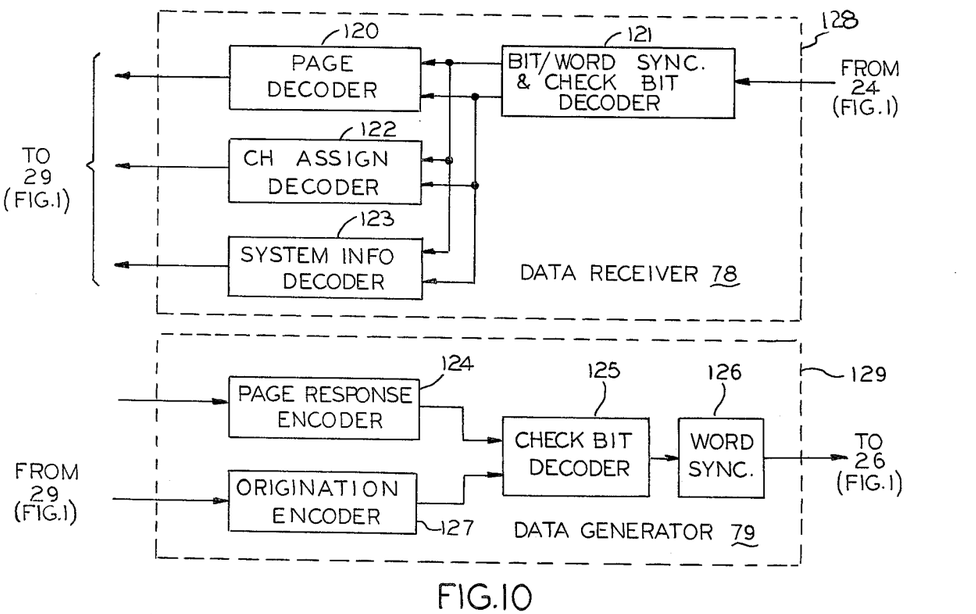
FIG. 10 is a block diagram of a data receiver and data generator in a mobile unit according to the present invention, which correspond to the data generator and data receiver shown in FIG. 1, respectively.

FIG. 10 is a block diagram of the data receiver 128 and data generator 129 of a mobile unit with the present invention, corresponding to the data receiver 78 and data generator 79 in (FIG. 4), respectively. The code lengths of the PRS (paging response code) and origination codes can be equalized, as stated. The data generator 79 of a conventional mobile unit requires two different check bit encoders 85 and 88 for two encoders 84 and 87 as in FIG. 4. The data generator 129 of the present invention is adequate to only one check bit encoder 125. The data receiver 128 in FIG. 10 has the same configuration and operation as those of the receiver 78 in FIG. 4. The decoders 120, 121, 122, and 123 correspond to the decoders 80, 81, 82, and 83, in FIG. 4.

Figure 11:
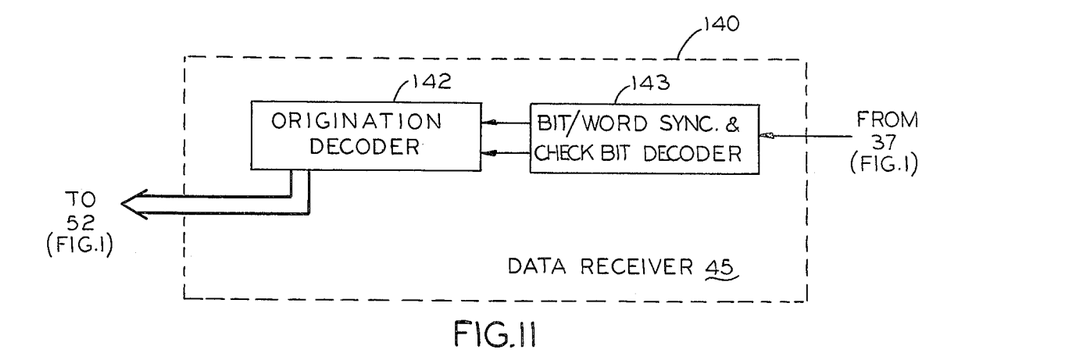
FIG. 11 is a block diagram of the data receiver in a control center shown in FIG. 1.
Figure 12:
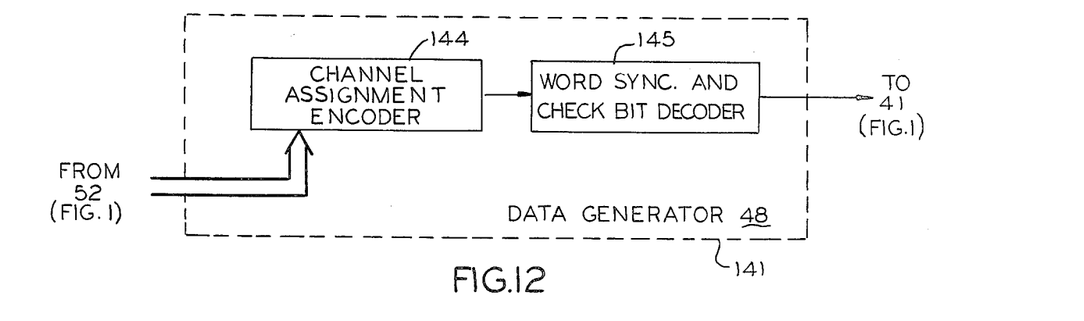
FIG. 12 is a block diagram of the data generator in a control center shown in FIG. 1.

FIGS. 11 and 12 are block diagrams giving details of a preferred embodiment of the present invention of a data receiver 45 and data generator 48 for A-ch (access channels) in FIG. 1. These drawings, reference show a data receiver 140; a data generator 141; an origination decoder; 142, a bit/word synchronization and check bit decoder; 143, a channel assignment encoder; and 144, a word synchronization and check bit encoder 145. These circuits 140 and 141 have the same constituent elements as those of the data receiver 100 and data generator 101 in FIG. 9, respectively, so that they can be made common.

A control signal transmission system is explained above, in connection with an automobile telephone radio communication system. In general, the present invention can be applied to mobile radio communication systems in which a control center sends SI (system information) and PA (paging) codes to mobile units that return PRS paging respose codes to the control center.

As stated, a feature of the invention system is that at least one frame of SI (system information) codes is sent from the control center to the mobile units each time that one frame of PA (paging) codes is sent. Each mobile unit returns PRS (paging response) codes including ID (identification) codes. This present invention provides a control signal transmission system for mobile radio communications of high reliability and simple configuration.

What is claimed is:

1. A control signal transmission system for use in mobile radio communications, said system having a plurality of mobile units each of which is identified by an individually associated identification number, at least one control center, and at least first and second common paging channel means linking each of said mobile units and said control center and using transmission via cyclically recurring time frames, said control center including first means for transmitting a pair of paging signals and system information signals to said mobile units via said first common paging channel means, at least one of said time frames carrying said system information signals following each time frame of said paging signals, and said mobile units including second means for transmitting response signals corresponding to said paging signals, to said control center via said second common paging channel means, each of said response signals including an identification number for a specific one of said mobile units.

2. The control signal transmission system for use in mobile communications claimed in claim 1, wherein each of said response signals has a signal time length which is greater than the signal length corresponding to one time frame.

* * * * *